R. E. HUNN.
GLASS VENEERED TERRA COTTA.
APPLICATION FILED FEB. 18, 1913.
1,119,352.
Patented Dec. 1, 1914.
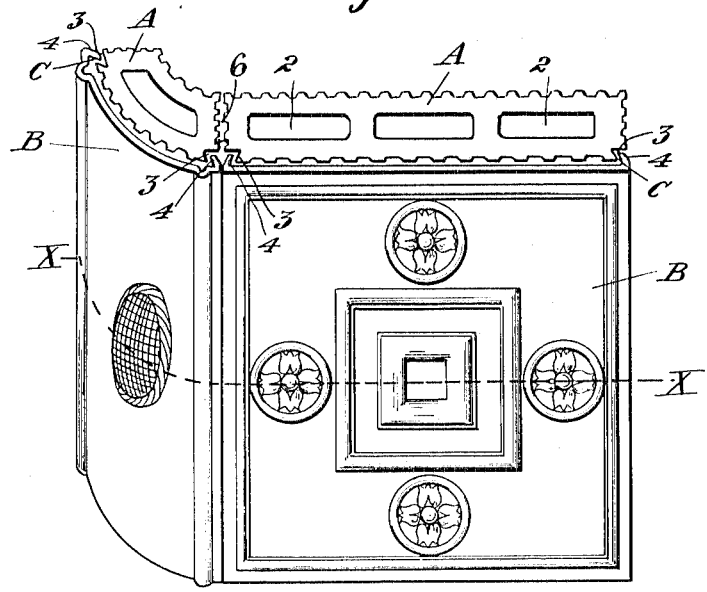
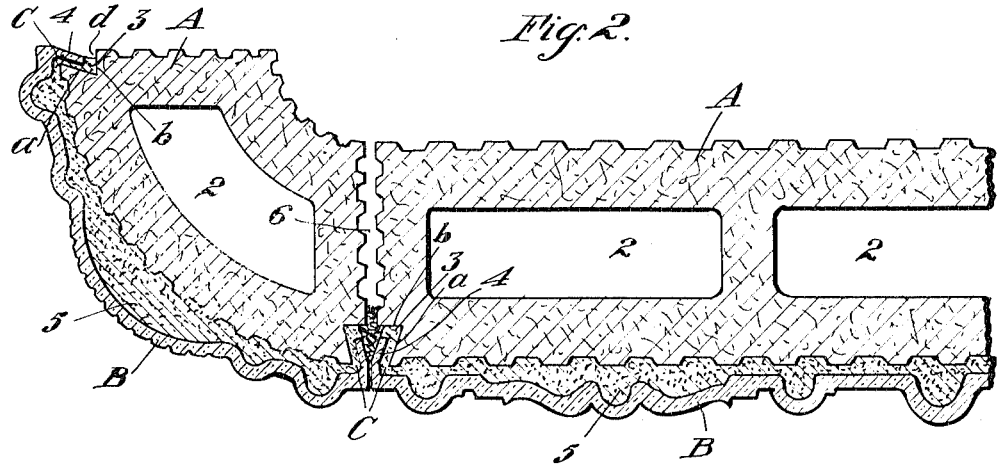
WITNESSES:
R. S. Berry,
Charles Pickles
INVENTOR
Robert E. Hunn
BY J. H. Strong.
ATTORNEY

UNITED STATES PATENT OFFICE.

ROBERT E. HUNN, OF SAN FRANCISCO, CALIFORNIA.

GLASS-VENEERED TERRA-COTTA.

1,119,352.   Specification of Letters Patent.   Patented Dec. 1, 1914.

Application filed February 18, 1913. Serial No. 749,169.

*To all whom it may concern:*

Be it known that I, ROBERT E. HUNN, a citizen of the United States, residing at the city and county of San Francisco and State of California, have invented new and useful Improvements in Glass-Veneered Terra-Cotta, of which the following is a specification.

This invention relates to a building block or tile, and particularly pertains to glass veneered terra-cotta.

It is the object of this invention to provide a building block or tile, as an article of manufacture, which is fire-proof and impervious to moisture, cheap in construction and durable.

A further object is to provide a block or tile which is particularly adapted for use in constructing walls and partitions, and which does not require further treatment or the application of coating materials, such as plaster, cement, paint, or other finishes, when set up.

Another object is to provide a simple and effective means for attaching a glass facing to blocks formed of terra-cotta or other refractory material, by means of which the blocks will be rendered ornamental and suitable for use in finishing exterior walls, and which facing will render the blocks waterproof.

The invention resides in a glass facing, corresponding in size and shape to the periphery of a terra-cotta block, to which it is to be attached, which glass facing is formed with recesses on its back and with inwardly inclined flanges or ribs on opposite edges, which are adapted to extend into grooves formed in the corresponding edges of the terra-cotta block; said glass facing and block being secured together by a suitable cementitious material interposed therebetween, all of which will be more fully described hereinafter, set forth in the appended claim and illustrated in the accompanying drawings, in which—

Figure 1 is a perspective view showing a square flat block and a curved corner block, constructed in accordance with the present invention. Fig. 2 is an enlarged detail section on the line X—X of Fig. 1.

In the drawings the terra-cotta block is indicated at A, and the glass facing or veneer is represented at B.

The terra-cotta block may be of any desired shape, but it is here shown as having a rectangular periphery and formed with air spaces 2 extending longitudinally therethrough, as is common in the ordinary well-known hollow terra-cotta blocks now commonly used in the construction of partition walls and the like.

In carrying out my invention, the terra-cotta block A is provided with angular recesses or grooves 3 on its front vertical edges. The recesses or grooves 3 are V-shaped and extend the length of the terra-cotta block to form offsets or shoulders *a* and *b* on the block at the juncture of the face of the block with its edges; the shoulders *a* facing the sides of the block being inclined rearwardly from the face of the block.

The glass jacket or facing B has an overall dimension slightly greater than the overall dimension of the terra cotta, the inner face of the facing being substantially the same size as the block, while the outer face extends beyond the edges of the body of the block. This difference in size is to allow the edges of the adjacent facings to come very close together and at the same time leave sufficient space between the blocks for the cement used in setting them up.

The facing B is formed with rearwardly projecting flanges 4 on its vertical edges, which flanges are inclined inwardly to form grooves or channels C on the inner sides. The flanges 4 and the channels C formed thereby preferably extend the full length of the facing B, and are adapted to extend into the grooves 3 on the terra-cotta block A, as shown.

Formed on the rear face of the glass jacket or facing B are a number of recesses or depressions 5 which may or may not correspond to an embossed or raised design with which the outer surface of the facing may be embellished; the depressions 5 forming an uneven and irregular surface on the back of the facing to facilitate its engagement by a suitable cementitious material with which the facing is secured to the block A.

In the process of manufacturing the product of this invention, the terra-cotta block A is shaped and burnt in the usual manner, and the glass facing B is formed in a suitable mold and is preferably of iridescent character and of any suitable design and ornamentation. When cold, the block A and the facing B are taken and are prepared for assembling; the former being coated on its outer face with a suitable plastic or cementitious material with which the facing grooves 3 are filled; the back of the facing B and the channels c being similarly coated with a like material after it has been coated with pitch, tar, or other suitable substance to assist in the adhesion of the cement thereto. The facing B is then placed upon the cemented face of the block A and pressed thereagainst, the flanges 4 on the plates extending into the grooves 3 in such manner that when the cement hardens between the flange and the inclined shoulder a a key will be formed which will serve to securely hold the facing against falling away from the block. The cement filling the recesses 5 in the back of the facing on hardening serve to prevent the facing from being moved sidewise or endwise on the block, and also forms a backing for the facing which serves the important function of preventing the glass from cracking and falling off when subjected to heat. After the article has been assembled as just described, the edges of the facing and block are cleaned of such cement as may have been crowded thereon, care being taken to remove some of the cement from the shoulders b to form a groove d adjacent the flanges 3 into which the cement employed in setting up a wall of the blocks will extend to form a locking key; the setting up cement being placed only in the grooves d on the edges of the block so that an air space, indicated at 6, will be formed therebehind. This enables the formation of an air space at the vertical joints of adjacent blocks to prevent the passage of moisture from the exterior to the interior wall.

By constructing a block with a glass facing, as hereinbefore described, an article is produced which is durable, not liable to crack, and which is fire-proof and impervious to moisture. It also possesses the combined qualities of terra-cotta and glass, without the detrimental features of either; it being well known that a satisfactory terra-cotta block cannot be formed owing to the shrinking and warping of the material when burned which produces an article of uneven dimensions, possessing many irregularities and porosity, which precludes its use in facing finished surfaces where accuracy is desirable.

Glass blocks are unfit for building purposes on account of their susceptibility to fracture and liability of breaking when subjected to intense heat. By facing a terra-cotta block with a glass facing, which can be formed in sizes and shapes to suit, the block can be rendered uniform in dimensions, so that it can be utilized in building a water-proof finished wall, and by backing the glass facing with cement the glass will be rendered proof against breaking if subjected to the action of intense heat; the cement and terra-cotta tending to keep the glass cool so that the glass can not fall to pieces when heated, it having been found that the glass will melt and run when sufficiently heated but will not crack and come off. The glass facing renders this article of particular advantage for use in places where the outer surface is exposed to the action of the elements and where subjected to dampness. It also forms a sanitary surface by reason of its non-porosity and the readiness with which it may be kept clean.

In the foregoing description, I have referred to the block as formed of terra-cotta and the facing as made of glass; but these members may be formed of other materials possessing the same qualities, as any suitable refractory material can be used in making the block and any non-porous glazed material, such as porcelain may be employed in making the plate.

The fire-proof tile or block A being porous and absorptive, absorbs the moisture in the cementitious material employed and allows the latter to harden and adhere firmly to the block and facing.

Having thus described my invention, what I claim and desire to secure by Letters Patent is:

A device of the character described comprising a terra-cotta member having under cut grooves at two of the front exterior angles, a vitreous facing having a forward over-all dimension slightly greater than the over-all dimension of said terra-cotta member, with the edges of said vitreous facing extending beyond and parallel to the edges of the terra-cotta member, flanges on the vitreous facing and extending inwardly from the forward edges thereof to form a wedge shaped recess, a shoulder adjacent said flange and determining said recess, and plastic material between said terra-cotta member and said vitreous facing.

In testimony whereof I have hereunto set my hand in the presence of two subscribing witnesses.

ROBERT E. HUNN.

Witnesses:
 JOHN H. HERRING,
 W. W. HEALEY.